No. 751,301. PATENTED FEB. 2, 1904.
G. KLEY.
WEIGHING MACHINE.
APPLICATION FILED MAR. 16, 1903.
NO MODEL.

Witnesses
Evert C Palmer
Geo. A. Hutchinson

Inventor
Gustav Kley
By Edson Bro's.
Attorneys

No. 751,301.

Patented February 2, 1904.

UNITED STATES PATENT OFFICE.

GUSTAV KLEY, OF SIEGBURG, GERMANY.

WEIGHING-MACHINE.

SPECIFICATION forming part of Letters Patent No. 751,301, dated February 2, 1904.

Application filed March 16, 1903. Serial No. 147,971. (No model.)

*To all whom it may concern:*

Be it known that I, GUSTAV KLEY, residing at Siegburg, Germany, have invented certain new and useful Improvements in Weighing-Machines, of which the following is a specification.

My invention relates to improvements in weighing apparatus.

Said invention has for its object, among other things, to provide for the weighing of loads or weights varying through a considerable or extended range and the scale-beam yet remain unchanged and with only the making of minimum changes in certain of the operative parts of the weighing apparatus whereby simplicity and cheapness are secured as relates to this class of apparatus as heretofore produced.

The nature of said invention consists of the combination of parts, including their arrangement, substantially as hereinafter more fully disclosed, and specifically pointed out by the claims.

Figure 1:
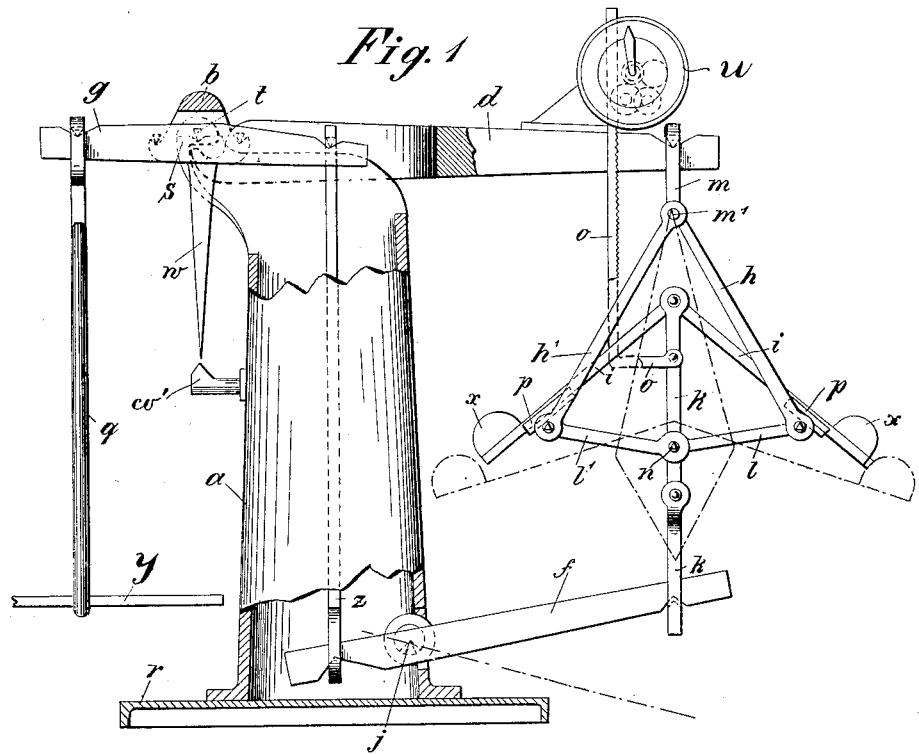
Figure 2:
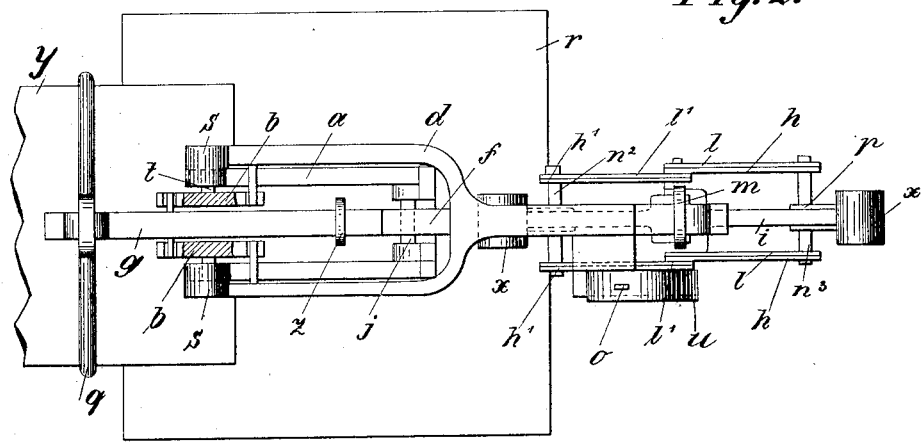

In the accompanying drawings, illustrating the preferred embodiment of my invention, Figure 1 is a side elevation, partly in section, thereof; and Fig. 2 is a plan, also partly in section, of the same.

It will be understood that latitude is allowed herein as to details, as they may be changed without departing from the spirit of my invention and the same yet be encompassed thereby.

In carrying out my invention I suitably support the operative parts in position, employing for the purpose, preferably, a hollow standard or support $a$, secured upon a base or platform $r$. A bridge-like or balancing casting or lever $b$ has lateral knife-edged pivots $t$, engaging or bearing in sockets or recesses in offset upward extensions $s$ of the standard or support $a$. Said balancing-lever $b$ has depending therefrom a pointer $w$, normally or initially standing in alinement with a tapered or knife-edged projection on an arm or extension $w'$ of the standard $a$, the purpose of which will appear hereinafter. A lever $g$, arranged about centrally with and above the standard $a$, has also lateral knife-edged pivots engaging or bearing upon duplicate arms of the balancing-lever $b$ at the rear thereof, and from one end of said lever $g$ is suspended on a knife-edged pivot the bail $q$, to the lower end of which is fixed the weighing-pan $y$. Said lever $g$ has looped thereon near its opposite end the upper end of a rod $z$, and suitably pivoted, as at $j$, in the forward or one side of the standard $a$ is a lever $f$, to which near one end is looped or otherwise connected the lower end of said rod $z$. A third bifurcated lever $d$ has branches or prongs fulcrumed by knife-edged pivots upon additional duplicate arms of the balancing lever or casting $b$ at its forward side, said branches or prongs bearing at their free ends upon the under sides of overhanging portions of the upward extensions $s$ of the standard $a$ near their pivots. A quadrilateral arrangement of links $h$ $h'$ $l$ $l'$ and a rod $k$, connected to such arrangement of links, as presently disclosed, form the connection between the lever or scale-beam $d$ and lever $f$, preferably as shown. The upper longer links $h$ $h'$ have a knife-edged pivotal connection $m'$ with a loop or stirrup $m$, having a knife-edged bearing upon the scale-beam or lever $d$. The lower shorter links $l$ $l'$ have a corresponding connection with said upper links by means of knife-edged bars $n^2$ $n^3$ and with the rod $k$ by means of a correspondingly-shaped bar $n$. Said rod $k$ has a loop connected to its lower end which receives and is adapted to form knife-edged contact with the lever $f$, the upper end of said rod having pivoted thereto the corresponding ends of arms $i$, supported and sliding in prismatic guides or keepers $p$, carried by the bars $n^2$ $n^3$ of the link arrangement referred to above. Said arms are adapted to carry weights, as indicated at $x$ $x$, which may be exchanged for different or varying sized weights as circumstances may require, as in the weighing operation. To said bar $k$ is also connected a right-angled rack $o$, adapted to actuate a pointer playing over a dial forming the face of a case $n$, inclosing gearing effecting connection between said rack and pointer.

In operation when the scale-pan $y$ is loaded, it naturally leaving its position of equilibrium, the lever $g$ will be accordingly tilted, moving the rod $z$ upwardly, the long arm of lever $f$ having reverse movement, whereby a downward pull is exerted upon the quadrilateral arrangement of links $h\ h'\ l\ l'$. The balancing-lever $b$ will also tilt, slightly elevating its right arm, having the effect to impart a considerable lifting action to the long arm of the scale-beam or lever $d$, its short arm being held under the overhanging portions of the upward extension of the standard $a$ as against movement. Said links will be relatively elongated, depressing the weight-arm-carrying rod $k$ and assuming the dotted-lined position, the weight-carrying arms $i$, with their weights $x$, being carried to the dotted-lined position indicated. The scale-beam lever $d$ will gradually come to rest and the pointer or index $w$ finally come into alinement with the point $w'$ to indicate whether or not the load has been removed from the scale-rack. According to the weight of load, the weights $x$ will be more or less raised, thus always effecting a balancing action. The rack $o$ will under the aforesaid action of the parts be moved, as is apparent, and correspondingly actuate the pointer of the scale-dial, as at $w$, and thus indicate the weight of the load. It is observed that by merely changing the relative arrangement of the links $h$ or $h'$ to $l$ or $l'$ the scale or weighing apparatus may be adapted to weigh the greatest possible weight or load; also, by proportionately varying the lengths of the links $h\ h'$ to links $l\ l'$ the apparatus may be adapted for weighing smaller and larger loads. Further, when the relation between the several levers $b\ g\ d\ f$ has been once determined, as in initially organizing the parts of the apparatus, no subsequent rearrangement or variation thereof is necessary even within the greatest range of weighing weights or loads. It is only required to replace the present framework of the apparatus by another of a corresponding character equal to the demands made upon it to provide for weighing the heaviest loads.

Having thus described my invention, what I claim, and desire to secure by Letters Patent, is—

1. The combination of a frame, a balancing-lever, a pan-carrying lever and a scale-beam fulcrumed respectively upon said balancing-lever, said scale-beam having one end bearing against a fixed point, a further lever operatively connected to said pan-carrying lever, a scale-dial pointer, means effecting connection between said scale-beam and said last-referred-to lever, and coacting means between the first-referred-to means, and the scale-dial pointer, whereby, by the conjoint action of said former and latter means the weight is indicated.

2. The combination of a balancing-lever, a pan-carrying lever and a bifurcated scale-beam fulcrumed, respectively, upon said balancing-lever, a standard having an upward extension with overhanging portions, said scale-beam having its branches or prongs bearing upon the under sides of said overhanging portions, a further lever operatively connected to said pan-carrying lever, a scale-dial pointer, means effecting connection between said scale-beam and said last-referred-to lever, and coacting means between the first-named means and the scale-dial pointer, whereby, by the conjoint action of said former and latter means the weight is indicated.

3. The combination of a frame, a balancing-lever, a pan-carrying lever and a scale-beam fulcrumed, respectively, upon said balancing-lever, said scale-beam lever having one end bearing against a fixed point, a further or additional lever operatively connected to said pan-carrying lever, a quadrilateral arrangement of links, a scale-dial pointer, means forming connection between said links and said additional lever, means carrying weights connected to the former means, and means effecting connection between said former means and the scale-dial pointer, said links, said weight-carrying means, said link and lever connecting means, and said pointer and link and lever connecting means, adapted to unitedly effect the actuation of said pointer to indicate the weight.

4. The combination of a frame, a balancing-lever, a pan-carrying lever, and a scale-beam lever fulcrumed, respectively, upon said balancing-lever, said scale-beam lever having one end bearing against a fixed point, a further or additional lever operatively connected to said pan-carrying lever, a scale-dial pointer, a quadrilateral arrangement of links, means of connection between said links, means forming connection between said links and said additional lever, arms carrying weights and connected to the means of connection between said links and said additional lever, and guided in position upon said means effecting connection between said links, and means forming connection between said link and additional lever-connecting means and the scale-dial pointer.

5. The combination of a frame, a balancing-lever, a pan-carrying lever, and a scale-beam lever fulcrumed, respectively, upon said balancing-lever, said scale-beam lever having one end bearing against a fixed point, and a further or additional lever operatively connected to said pan-carrying lever, a scale-dial pointer, a quadrilateral arrangement of links, means of connection between said links, means forming connection between said links and said additional lever, arms carrying weights and connected to the means of connection between said links and said additional lever, and guided in position upon means effecting connection between said links, and a rack connected to the means of connection between said links and said additional lever, and adapted to actuate the scale-dial pointer.

6. The combination of a frame, a balancing-lever, a pan-carrying lever, and a scale-beam fulcrumed, respectively, upon said balancing-lever, said scale-beam lever having one end bearing against a fixed point, a further or additional lever operatively connected to said pan-carrying lever, a quadrilateral arrangement of links, cross-bars effecting connection between said links, a rod forming connection between said links and said additional lever, a scale-dial pointer, means carrying weights connected to said rod and guided in position upon said cross-bars, and means forming connection between said rod and the scale-dial pointer.

7. The combination of a frame, a balancing-lever, a pan-carrying lever, and a scale-beam lever fulcrumed, respectively, upon said balancing-lever, said scale-beam lever having one end bearing against a fixed point, a further additional lever operatively connected to said pan-carrying lever, a quadrilateral arrangement of links, cross-bars connecting said links, a rod forming connection between said links and said additional lever, a scale-dial pointer, arms carrying weights connected to said rod and held in position in guides carried by said cross-bars, and a rack having right-angled connection with said rod and adapted to actuate the scale-dial pointer.

8. The combination of a scale-beam lever, a pan-carrying lever operatively connected up with said scale-beam lever, a further or additional lever operatively connected to said pan-carrying lever, and means effecting connection between said additional lever and scale-beam lever, comprising a quadrilateral arrangement of links articulated together and looped to said scale-beam lever, cross-bars connecting said links, a scale-dial pointer, a rod looped to said links and said additional lever, weight-carrying arms connected to said rod and guided by means of said cross-bars, and a rack having right-angled connection with said rod and adapted to actuate the scale-dial pointer.

9. A weighing apparatus combining a scale-beam lever, a pan-carrying lever and an additional lever, operatively connected together, and a quadrilateral arrangement or series of pivoted together links connected to said scale-beam lever, means connecting said links and said additional lever, a scale-dial pointer, means carrying weight-provided arms, connected to said links and means for actuating the scale-dial pointer, connected to said arm-carrying means.

In testimony whereof I have hereunto set my hand in the presence of two witnesses.

GUSTAV KLEY.

Witnesses:
W. FRHRR. VON LYNCKER,
CARL SCHMITT.